US010029526B2

(12) United States Patent
Keller (10) Patent No.: US 10,029,526 B2
(45) Date of Patent: Jul. 24, 2018

(54) SPRING ARM DEVICE (71) Applicant: Tobias Keller, Dittelsheim-Hessloch (DE)

(72) Inventor: Tobias Keller, Dittelsheim-Hessloch (DE)

( * ) Notice: Subject to any disclaimer, the term of this patent is extended or adjusted under 35 U.S.C. 154(b) by 0 days.

(21) Appl. No.: 15/123,685

(22) PCT Filed: Mar. 4, 2015

(86) PCT No.: PCT/EP2015/054505
§ 371 (c)(1),
(2) Date: Sep. 6, 2016

(87) PCT Pub. No.: WO2015/132298
PCT Pub. Date: Sep. 11, 2015

(65) Prior Publication Data
US 2017/0217272 A1    Aug. 3, 2017

(30) Foreign Application Priority Data

Mar. 6, 2014 (DE) .................... 10 2014 103 014

(51) Int. Cl.
B60G 3/28        (2006.01)
B60G 7/00        (2006.01)
F16F 1/368       (2006.01)

(52) U.S. Cl.
CPC ............... B60G 3/28 (2013.01); B60G 7/001 (2013.01); F16F 1/368 (2013.01);
(Continued)

(58) Field of Classification Search
CPC ........ B60G 2206/15; B60G 3/28; B60G 3/20; B60G 7/001; F16F 1/368
See application file for complete search history.

(56) References Cited

U.S. PATENT DOCUMENTS 3,219,333 A * 11/1965 Derschmidt .......... B29C 70/086
                                              188/268
4,457,500 A *  7/1984 Drachenberg ........ B29C 70/085
                                              267/148

(Continued)

FOREIGN PATENT DOCUMENTS

DE         3429989 A1 *  4/1986  ............... B60G 3/28
DE       69002316 T2     1/1994

(Continued)

Primary Examiner — Nicole T Verley
(74) Attorney, Agent, or Firm — Agris & Von Natzmer, LLP; Joyce von Natzmer (57) ABSTRACT The invention relates to a spring arm device (1) for a motor vehicle, comprising two flanges (2) arranged at a distance from each other and which are made of a first fiber composite material (4) having fibers (6) each oriented in a longitudinal direction (5) of the flanges (2). The spring arm device (1) also comprises a web (3) which connects the flanges (2) and is made of a second fiber composite material (7) having the fibers (8) oriented at positive angles to the longitudinal directions (5) of the flanges (2). The spring arm device (1) can be fastened in end regions (15) opposite to each other to vehicle parts as part of a wheel suspension. The end regions (15) comprise end segments (14) of the two flanges (2) associated with each other and each comprise an end segment (9) of the web (3) that connects the end segments (14) of the flanges (2). Respective forces applied to the spring arm device (1) in the longitudinal direction (5) by means of the end regions (15) can be transmitted by means of the flanges (2). By means of a spring force, the flanges (2) counteract deformation of the spring arm device (1) caused by forces acting in a normal direction (16) of the web (3). Forces acting on the spring arm device (1) in a transverse direction (13) are transmitted from the web (3) to the end regions (15).

19 Claims, 8 Drawing Sheets (52) U.S. Cl.
CPC ...... *B60G 2202/20* (2013.01); *B60G 2206/15* (2013.01); *B60G 2206/70* (2013.01)

(56) References Cited

U.S. PATENT DOCUMENTS

| | | | | |
|---|---|---|---|---|
| 4,468,014 | A * | 8/1984 | Strong | F16F 1/368 188/268 |
| 4,509,774 | A | 4/1985 | Booher | |
| 4,530,490 | A * | 7/1985 | Misumi | F16F 1/368 267/149 |
| 4,688,778 | A * | 8/1987 | Woltron | B29C 43/32 267/148 |
| 4,753,456 | A * | 6/1988 | Booher | B29C 70/52 280/124.134 |
| 4,886,254 | A * | 12/1989 | Carpentier | B29C 70/86 267/148 |
| 4,894,108 | A * | 1/1990 | Richard | B29C 70/24 156/245 |
| 4,902,548 | A * | 2/1990 | Cholat-Serpoud | A63C 5/12 428/102 |
| 4,969,633 | A * | 11/1990 | Ryan | B29C 33/005 267/149 |
| 5,267,751 | A * | 12/1993 | Hiromoto | B60G 3/10 280/124.134 |
| 6,152,433 | A * | 11/2000 | Hettich | B60G 7/001 180/352 |
| 6,616,159 | B2 | 9/2003 | Lawson | |
| 6,811,169 | B2 * | 11/2004 | Schroeder | B60G 3/28 267/149 |
| 7,077,066 | B2 * | 7/2006 | Blohberger | B61F 5/325 105/218.2 |
| 7,845,663 | B2 * | 12/2010 | Gerrard | B60G 3/20 280/124.134 |
| 8,025,301 | B2 * | 9/2011 | Guttilla | B23P 15/00 280/124.134 |
| 8,616,570 | B2 * | 12/2013 | Mielke | B60G 7/001 280/124.134 |
| 8,925,909 | B2 * | 1/2015 | Drabon | B60G 11/04 267/148 |
| 9,115,778 | B2 * | 8/2015 | Wagner | B60G 11/08 |
| 9,233,588 | B2 * | 1/2016 | Miller | B60G 7/003 |
| 9,597,938 | B2 * | 3/2017 | Spiegel | B60G 11/02 |
| 9,744,993 | B2 * | 8/2017 | Makisalo | B62D 7/18 |

FOREIGN PATENT DOCUMENTS

| | | | | |
|---|---|---|---|---|
| DE | 69421680 | T2 | 6/2000 | |
| DE | 10216244 | A1 | 12/2002 | |
| DE | 60102492 | T2 | 3/2005 | |
| DE | 102011104071 | A1 * | 12/2012 | ............ B29C 70/46 |
| DE | 102014208403 | A1 * | 11/2015 | ............... B60G 3/28 |
| EP | 0134617 | A1 * | 3/1985 | ......... B29D 99/0007 |
| GB | 2100201 | A * | 12/1982 | ............. B60G 3/265 |
| JP | 59089842 | A * | 5/1984 | |
| JP | 63225738 | A * | 9/1988 | |
| JP | 4994635 | B2 * | 8/2012 | |
| WO | WO-2004003403 | A1 * | 1/2004 | ............. F16F 1/185 |
| WO | 2011141538 | A1 | 11/2011 | |

* cited by examiner

FIG 8

SPRING ARM DEVICE

This is the U.S. national stage of International application PCT/EP2015/054505, filed Mar. 4, 2015, which claims priority to DE Patent application no. 102014103014.1, filed Mar. 6, 2014, both of which are incorporated herein by reference in their entireties.

The invention relates to a spring arm device for a motor vehicle. The invention also relates to a wheel suspension having at least one spring arm device.

Wheel suspensions for motor vehicles usually comprise a suspension in order to achieve that wheels arranged on a wheel carrier of a wheel suspension of a motor vehicle follow unevenness of a road and thus ensure a most uniform road adhesion, wherein the suspension uncouples the wheels from the rest of the vehicle to the greatest possible extent so that the rest of the vehicle is not brought into an up-and-down movement. In modern motor vehicles, coil springs made of spring steel are usually used, said springs arranged in a dome that is arranged above the wheel carrier and supporting themselves against said dome.

Conventional wheel suspensions additionally comprise so-called suspension arms. These arms are struts configured in a rod-shaped manner in the simplest case, whereas said struts are pivotably hinged on the wheel carrier and the chassis. Braking forces and cornering forces acting on the wheels are transmitted to the chassis via the suspension arms.

Conventional wheel suspensions are usually made of steel and require an important construction space due to the plurality of components.

The object of the invention is to provide a spring arm device which combines the functions of the suspension and the suspension arms of a wheel suspension in one or multiple similar components.

Said object is achieved by means of a spring arm device for a motor vehicle with two flanges arranged at a distance from each other and which are made of a first fiber composite material having fibers each oriented in a longitudinal direction of the flanges and having a web which connects the flanges, which web is made of a second fiber composite material with the fibers oriented at positive angles to the longitudinal directions of the flanges, wherein the spring arm device can be fastened to vehicle parts in opposite end regions as part of a wheel suspension, wherein the end regions comprise end segments of the two flanges associated with each other and in each case one end segment of the web that connects the end segments of the flanges, so that forces introduced into the spring arm device can be transmitted by the flanges in each case in the longitudinal direction via the end regions, so that the flanges counteract deformation of the spring arm device caused by forces acting in a normal direction of the web by means of a spring force, and so that forces acting on the spring arm device in a transverse direction are transmitted from the web to the end regions.

Both the flanges and the web can be produced from commercially available pre-pregs. This enables a particularly cost-effective production of the spring arm device. Due to the considerably reduced weight of fiber composite materials compared to steel components, the weight of the spring arm device is considerably reduced when compared to conventional steel suspensions and conventional suspension arms as well. Furthermore, the required construction space for the wheel suspension can be significantly reduced by integrating the functions of the suspension and of the suspension arms into one spring arm unit.

The flanges are configured as rods, i.e. elongated parts with fibers running in the longitudinal direction. If said flanges are clamped in their opposing end portions and said end portions are displaced parallel relative to one another, the flanges are elastically deformed. The uni-directionally-running fibers counteract the deformation by means of a restoring force that substantially depends on the dimensions of the flanges and the fiber composite material used. Suspension for the wheel suspension is thus provided by the flanges. Due to the orientation of the fibers of the flanges, the flanges are also suitable for transmitting forces such as cornering forces introduced via the end portions from the wheel carrier to the chassis in the fiber direction. However, the flanges, due to the fiber orientation thereof, are only of limited suitability for transmitting the braking forces acting on the flanges in crossed direction as well as the braking torques applied to the flanges to the vehicle frame during a braking operation of the vehicle.

To this end, the flanges are connected through the web. Said web is a part of planar design having fibers oriented in different directions, via which braking forces between the end portions of the spring arm device can be transmitted so that a twisting of the spring arm device is prevented. Therefore, the web is a shear field for transmitting the forces acting in crossed direction and for transmitting the torque acting around the longitudinal direction from the wheel carrier to the vehicle frame. To that end, the fibers of the second fiber composite material need not be aligned in parallel to the fibers of the flanges, but run at an angle to the fibers of the first fiber composite material.

The webs advantageously have the essentially same length as the flanges and advantageously have a considerably greater width than the flanges in order to enable the required twisting rigidity of the spring arm device. Here, the width of the web is adjusted such that the web is capable of transmitting the maximum occurring braking forces and braking torques from the wheel carrier to the vehicle frame.

In order to adjust the suspension effect of the spring arm device, it is also provided according to the invention that further flanges are arranged between the flanges in the area of the web. Expediently, said flanges abut against the web on the outer surfaces of the web so that the web is not interrupted by the additional flanges.

According to the invention it is advantageously provided that the flanges have a protrusion on opposite web surfaces of the web, said protrusion being substantially uniform or adapted to the tensile course. The protrusion can be adapted to the tensile course developing in the edge sides of the flanges due to compression and expansion of said edge sides in the longitudinal direction of the fibers in a relative normal direction during a spring-in operation. In a parallel displacement of the end regions relative to one another, a first lateral surface of the spring arm device is compressed, while a second lateral surface of the spring arm device is expanded. This compression and expansion produces the restoring force causing the suspension effect. The flanges are elastic particularly in terms of said stress due to the fiber orientations of the fibers of the flanges in the direction of the respective expansion or compression. On the other hand, a strong expansion or compression, respectively, of the web surfaces of the web should be avoided due to the orientation of the fibers of the second fiber composite material, since resistance of the web to such stress is lower.

According to the invention, this is made possible by configuring the spring arm device with flanges protruding beyond the web surfaces in a uniform manner or in a manner adapted to the tensile course. In a deflection of the spring arm device, the opposite flange surfaces are expanded or compressed, respectively, the expansion or compression in the longitudinal direction of a center line of the flange being 0. By arranging the web on the flanges in the region of said center line, a very small expansion or compression, respectively, of the opposite web surfaces is enabled, since the maximum expansion or compression occurs in opposite planes defined by the flange surfaces of the spring arm device. According to the invention, the web is expediently arranged in the region of the center lines of the flanges, said center line also being referred to as neutral fiber, since fibers running through the flange along the longitudinal direction are neither expanded nor compressed in a parallel shift of the end portions of the flanges relative to one another.

Advantageously, pre-pregs are used for producing the spring arm device. For producing the web, first a planar section is cut out from a pre-preg of the second fiber composite material. The flanges advantageously consist of two flange strips, which are also produced by being cut out from a pre-preg of the first fiber composite material. The spring arm device is produced from the prepared web and the prepared flange strip in that the flange strips are arranged in edge regions of the web on the opposite web surfaces in such a way that in each case two flange strips are arranged opposite to one another on an edge region of the web. Subsequently, the flange strips are pressed to the web so that the matrices of the first fiber composite material and the second fiber composite material connect to one another and the flange strips and the flange form an integral component.

In order to be able to transmit the braking forces and braking torques applied to the spring arm device via the web and, at the same time, allow a most simple and cost-effective production of the spring arm device, it is provided according to the invention that the fibers of the second fiber composite material run crossed relative to one another. By fibers running crosswise to one another in such a way, the braking forces and braking torques can be transmitted from the wheel carrier to the vehicle frame and vice versa in a particularly effective manner. Furthermore, fiber composite materials having crossed fibers are commercially available as so-called 45 degree pre-pregs and can thus be used in a cost-effective manner.

It is also provided and possible according to the invention that the spring arm device is not completely clamped in the end regions, but for example punctually fixed in the end regions of the flanges on the wheel carrier and the vehicle frame of the vehicle. In order to allow for a most high stability of the spring arm device and sufficient force transmission between the clamping locations when fixing the spring arm device in such a way, it is provided according to the invention that posts configured as rods with fibers running uni-directionally in longitudinal direction of the posts or in the crosswise direction of the spring arm device are arranged in end portions of the web.

According to the invention, it is advantageously provided that the flanges and the web are connected to each other in a pre-clamped position, so that the spring arm device has an S-profile-shaped cross-section along a center axis connecting the end regions. According to the invention, it is also provided that the spring arm device is pre-shaped in such a way that is has an arc-shaped course. This achieves that the spring arm device mounted in the vehicle is deflected into a zero position when subjected to the weight force of the motor vehicle, the spring arm device having a substantially level course in said zero position. As a result, the maximum possible deflection of the spring arm device is available for the suspension of the motor vehicle during operation.

In a particularly advantageous embodiment of the spring arm device according to the invention, it is provided that the flanges are aligned to each other in a trapezoidal form at a trapezoidal angle. This way, a particularly high stability of the spring arm device can be achieved.

In order to allow for a most good driving behavior of the motor vehicle if the spring arm device is mounted in said motor vehicle, it is provided according to the invention that a spring characteristic of the spring arm device is linear to progressive. This can be achieved by using the flanges made of the first fiber composite material in an especially simple manner when compared to steel springs.

The invention further relates to a wheel suspension having at least one spring arm device as described above. According to the invention, an end region of the spring arm device is fastened to a wheel carrier of the wheel suspension, wherein an end region opposite the fixed end region can be connected to a chassis of a motor vehicle. Due to the fact that this allows dispensing with an additional suspension and further suspension arms, the wheel suspension according to the invention is of particular light weight and requires smaller construction space than conventional wheel suspensions.

The wheel suspension advantageously comprises two spring arm devices, wherein said spring arm devices are arranged on the wheel carrier at least almost parallel to one another offset. The lateral surfaces of the spring arm devices used are generally arranged and aligned on the wheel carrier in such a way that the transverse direction of the spring arm devices is aligned almost axis-parallel to the longitudinal axis of the vehicle. Here, an angle may be provided between the transverse direction of the spring arm device and the longitudinal axis of the motor vehicle in the rest position of the motor vehicle, such an angle also being caused by the compression and rebound of the spring arm device. However, this angle is in each case smaller than 90 degrees, usually smaller than 45 degrees and advantageously in a range between 0 and 20 degrees.

In a particular advantageous embodiment of the wheel suspension, it is provided according to the invention that the wheel suspension has a damping device, wherein the damping device is mounted on the wheel carrier in a pivotable manner and can be connected to the chassis, wherein the damping device comprises a spring having a non-linear spring characteristic and which is configured and arranged in such a way that the damping device is prevented from butting against end stops of the damping device.

The spring arm device of the wheel suspension is advantageously configured and arranged on the wheel carrier such that the spring arm device serves as a transverse and/or longitudinal stabilizer. This way, the spring arm device according to the invention also assumes the function of a transverse stabilizer and/or longitudinal stabilizer so that the weight, the required construction space and the production cost of the wheel suspension can be further reduced.

According to the invention, it is advantageously provided, that the wheel suspension comprises two spring arm devices spaced apart from each other and arranged in such a way that the spring arm device acts as a trailing arm, an upper control arm, a lower control arm, a stabilizer and a spring. In order to configure and arrange the spring arm devices accordingly, a flange thickness, a flange width, a web thickness, a distance of the spring arm device in the region of the wheel carrier to one another, the trapezoidal angel, the angle between the transverse direction of the spring arm device and the vehicle longitudinal axis as well as an angle of the transverse directions of the two spring arm devices are determined relative to one another when knowing the vehicle to be equipped with the wheel suspension by means of known optimization methods. To this end, the wheel suspensions are modelled in a manner known per se and optimized in terms of the indicated parameter. Further optimization variables are conceivable with respect to the arrangement of the spring arm device on the wheel carrier, such as a distance of center axes of the spring arm device, which are oriented in the respective normal devices of the spring arm devices.

Further advantageous embodiments of the spring arm device according to the invention will be further explained by means of the exemplary embodiments illustrated in the drawings.

Shown are in.

Figure 1:
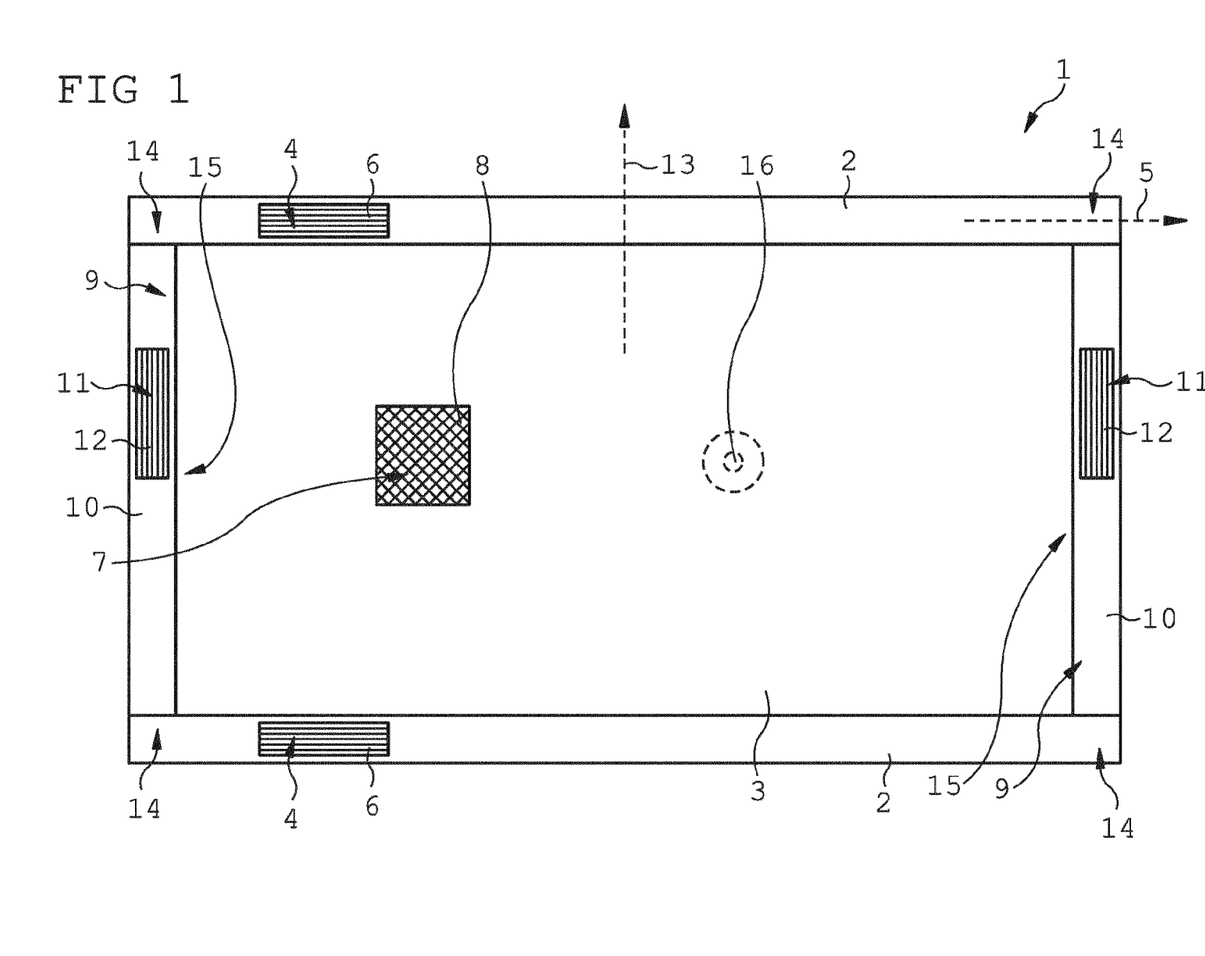
FIG. 1 a schematically illustrated plan view of a spring arm device illustrated partially cut, FIG. 2 a schematically illustrated plan view of spring arm device configured in a trapezoidal manner illustrated partially cut, FIG. 3 a schematically illustrated view of two spring arm devices configured in a trapezoidal manner and arranged at a distance to one another, FIG. 4 a schematic illustration of two spring arm devices arranged at a distance to one another, wherein the spring arm devices are configured in an arcuate manner, FIG. 5 a schematic illustration of two spring arm devices arranged at a distance to one another, wherein the spring arm device is configured in an S-shape.

FIG. 1 is a schematic plan view of a spring arm device 1 illustrated in a partially cut manner. The spring arm device 1 comprises two flanges 2 arranged at a distance to one another, said flanges being connected to one another by a web 3. The flanges 2 consist of a first fiber composite material 4 each with fibers 6 oriented in the longitudinal direction 5 of the flanges 2. The web 3 consists of a second fiber composite material 7 with fibers 8 being oriented at positive angles to the longitudinal directions 5 of the flanges 2. The flanges 2 and the webs 3 are produced from pre-pregs.

The web 3 comprises posts 10 arranged in opposite end segments 9 of the web 3, wherein the posts 10 are produced from a third fiber compound material 11. The fibers 12 of the posts 10 are oriented uni-directionally in a transverse direction 13 of the spring arm device 1.

Two opposite end regions 15 of the spring arm device 1 are defined by the end segments 9 of the webs 3 as well as by opposite end segments 14 of the flanges 2. In said end regions 15, the spring arm device 1 can be fixed to vehicle parts such as a wheel carrier and a vehicle frame. When the end regions 15 of the spring arm device 1 are displaced parallel to one another in the normal direction 16 or counter the normal direction 16, respectively, the flanges 2 and the web 3 are deformed. The flanges counteract said deformation by means of a restoring force so that a spring effect is invoked by the flanges 2.

Figure 2:
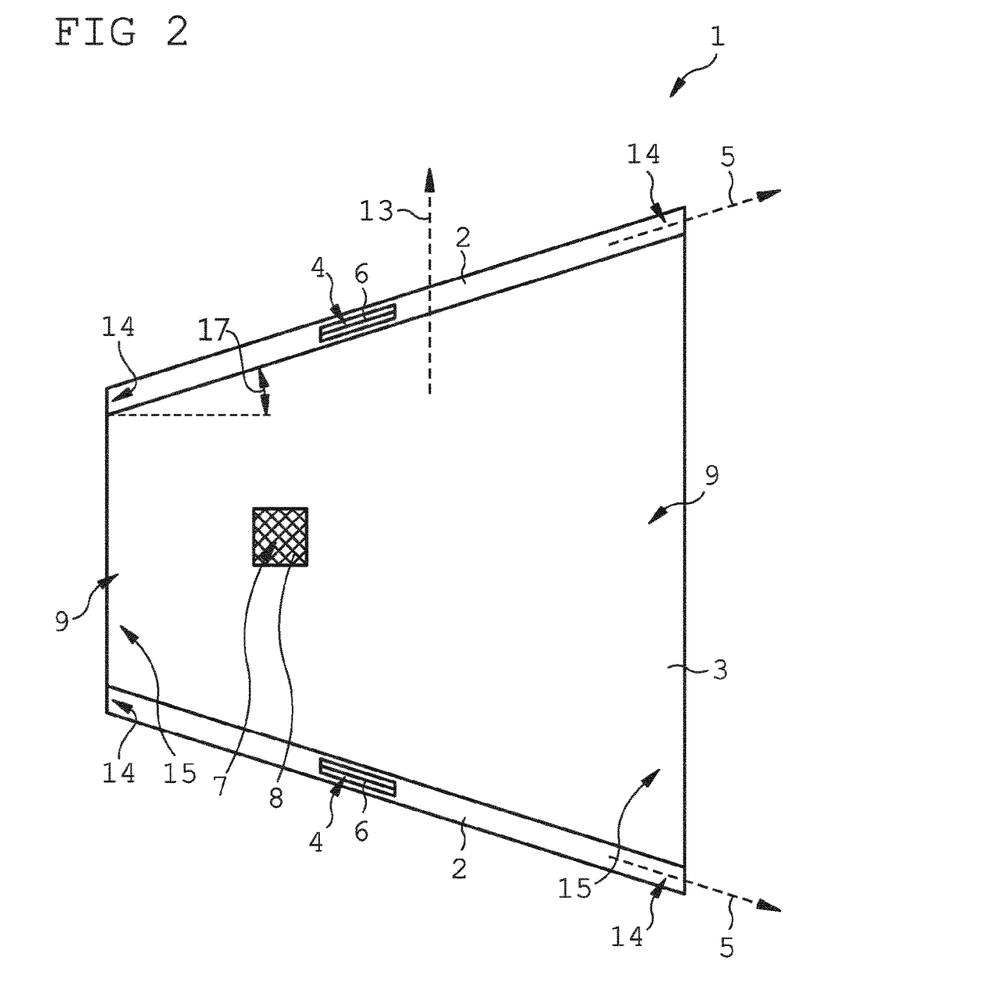

FIG. 2 shows schematically illustrated plan view of a trapezoidal spring arm device 1 illustrated in a partially cut manner. The flanges 2 of the spring arm device 1 are arranged trapezoidal to one another at a trapezoidal angle 17.

In contrast to the spring arm device 1 illustrated in FIG. 1, the spring arm device 1 illustrated in FIG. 2 does not comprise posts. Said posts may be dispensed with, provided the spring arm device 1 is entirely fixed to the vehicle parts in the end regions 15, for example in a clamping manner.

In FIGS. 3 to 6 described in the following, in each case one component of multiple similar components is indicated with a reference numeral in an exemplary manner.

Figure 3:
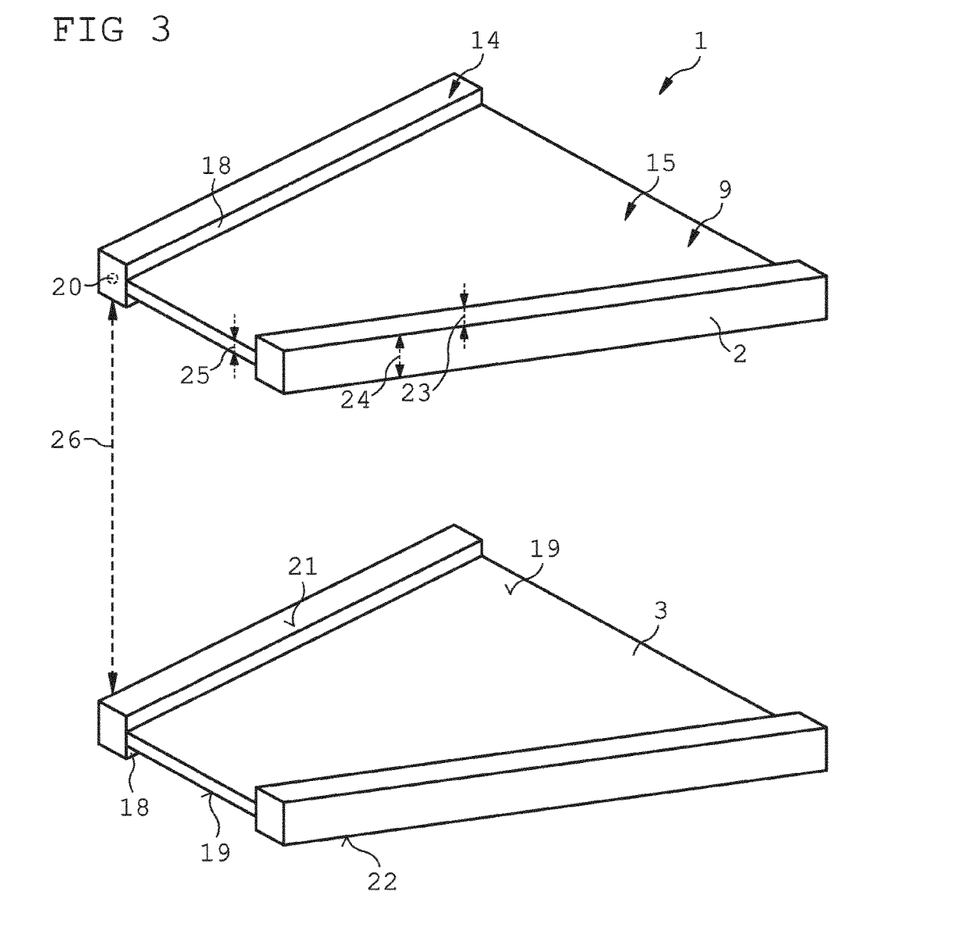

FIG. 3 schematically shows a view of two trapezoidal spring arm devices 1 arranged at a distance to one another. The flanges 2 of the spring arm devices 1 each comprise a protrusion 18 over opposite web surfaces 19 of the webs 3. The webs 3 are in each case arranged in a region of a center line 20 or a neutral fiber, respectively. When displacing the end regions 15 of the spring arm devices 1 relative and parallel to one another, the respective opposite flange surfaces 21 and 22 of the flanges 2 are strongly expanded or compressed, respectively. The neutral fiber running longitudinally along the respective center line 20 will neither be compressed nor expanded in said parallel displacement or shift of the end regions 15. The arrangement of the webs 3 in the region of the center lines 20 as well as by the protrusions 18 is achieved in that the web surfaces 19 are only slightly expanded or compressed, respectively.

A flange width 23, a flange thickness 24, a web thickness 25 as well as a distance 26, by means of which the spring arm devices 1 are fixed to a wheel carrier (not illustrated), can be considered as target values of a known optimization method for determining specific parameters for a predetermined motor vehicle application.

The illustrated arrangement of the two spring arm devices 1 generally corresponds to a possible arrangement on a wheel carrier and a vehicle frame, wherein the side of the spring arm device 1, on which the spring arm device has a smaller width due to the trapezoidal design, is assigned to the wheel carrier. The spring arm devices 1 are arranged advantageously and for all embodiments in such a way that web surfaces 19 are essentially horizontally arranged at least in a spring state.

Figure 4:
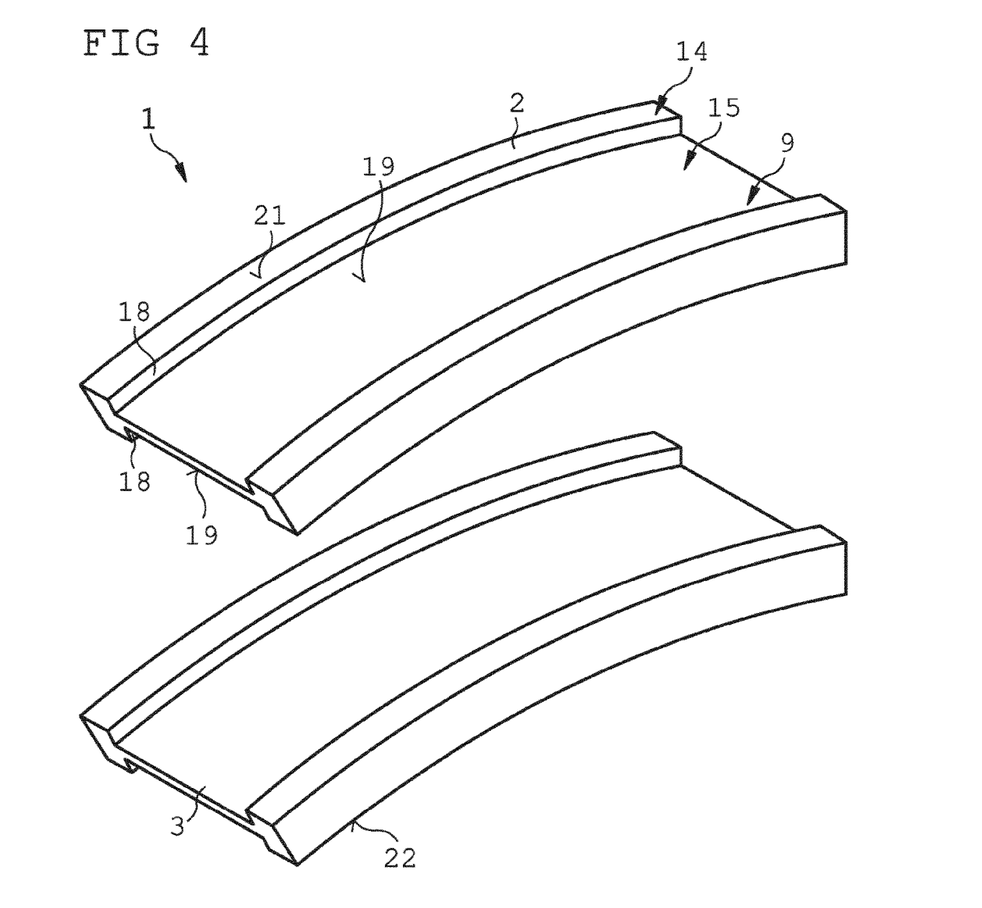
Figure 5:
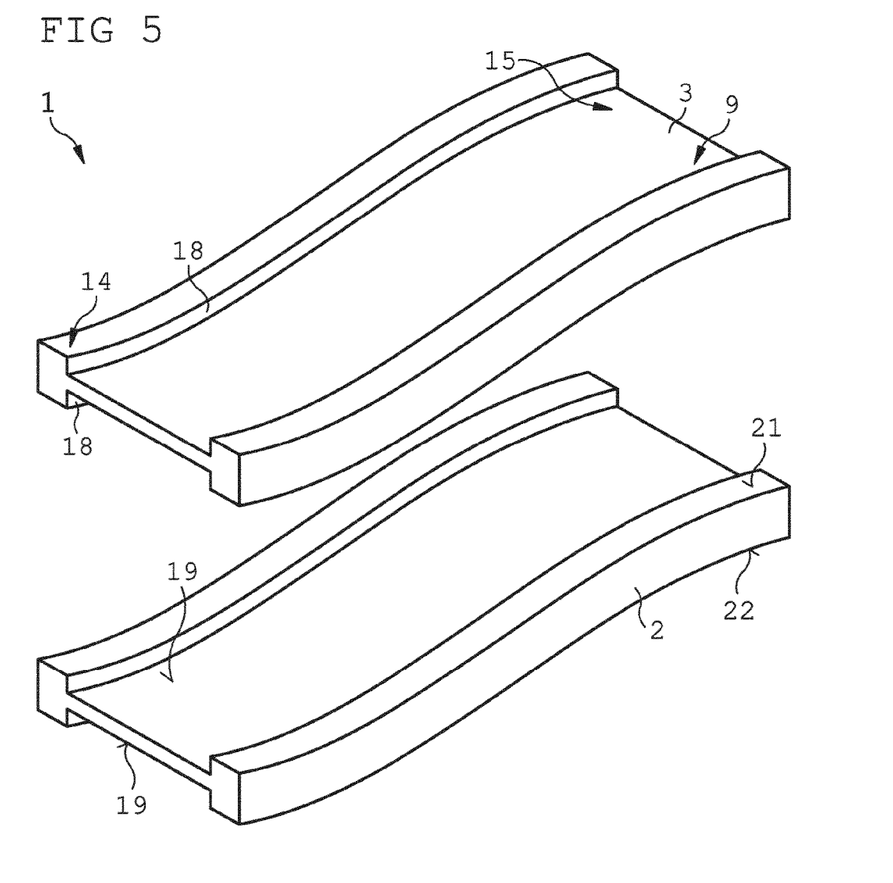
Figure 6:
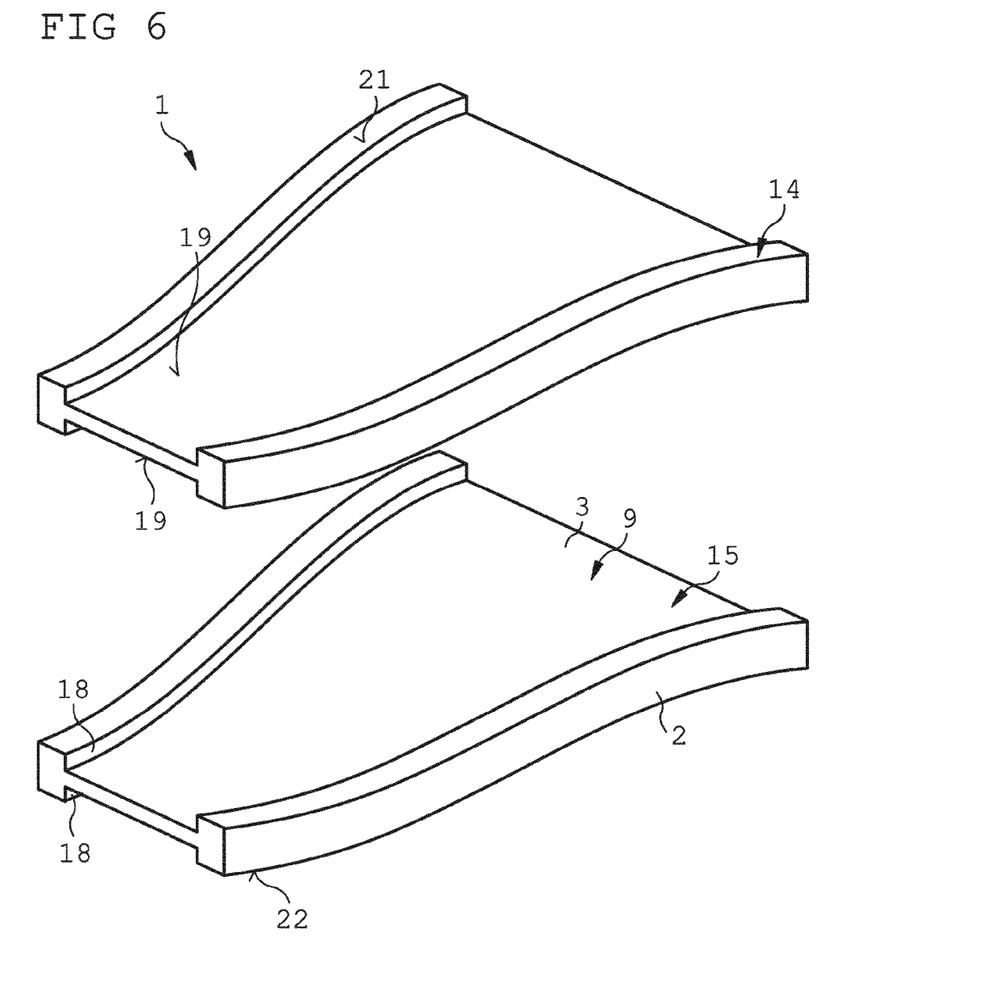
FIG. 6 is a schematic illustration of two trapezoidal spring arm devices arranged at a distance to one another, wherein the spring arm devices are configured in an S-shape.

FIGS. 4, 5 and 6 each show two spring arm devices 1 arranged at a distance to one another. Said spring arm devices each have a pre-stress that is selected and adapted to a motor vehicle weight such that the spring arm devices 1 are deformed in an essentially level or even shape in an installation position in the motor vehicle when being subjected to the weight force caused by the motor vehicle weight and acting on the spring arm devices 1. This way, the maximum possible spring path of the spring arm device 1 is available in the installation position.

The spring arm devices 1 illustrated in FIG. 4 are pre-stressed in a arcuate manner and the spring arm devices 1 illustrated in FIGS. 5 and 6 are pre-stressed in an S-shape. Further, the spring arm devices 1 illustrated in FIG. 6 are designed in a trapezoidal shape.

Figure 7:
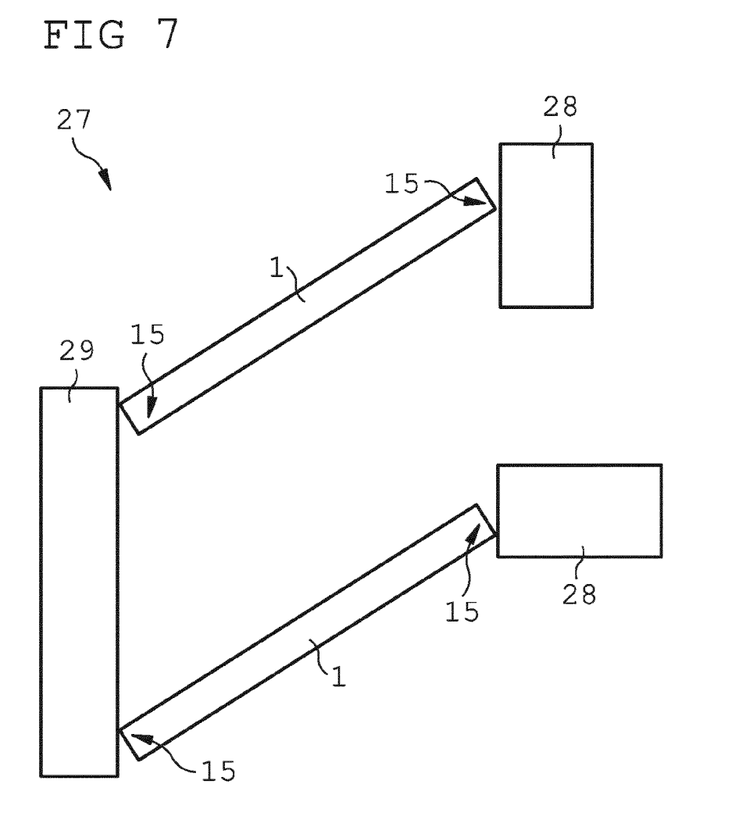
FIG. 7 is a schematic illustration of a wheel suspension arranged on a motor vehicle.

FIG. 7 shows a schematic illustration of a wheel suspension 27, which is arranged on holmes 28 of a vehicle frame via spring arm devices 1. The spring arm devices 1 are fixed to a wheel carrier 29 of the wheel suspension 27 in an end region 15 and fixed to the holmes 28 in a opposite end region 15. The illustration shows a schematic side view (in the driving direction) of the spring arm devices 1.

Figure 8:
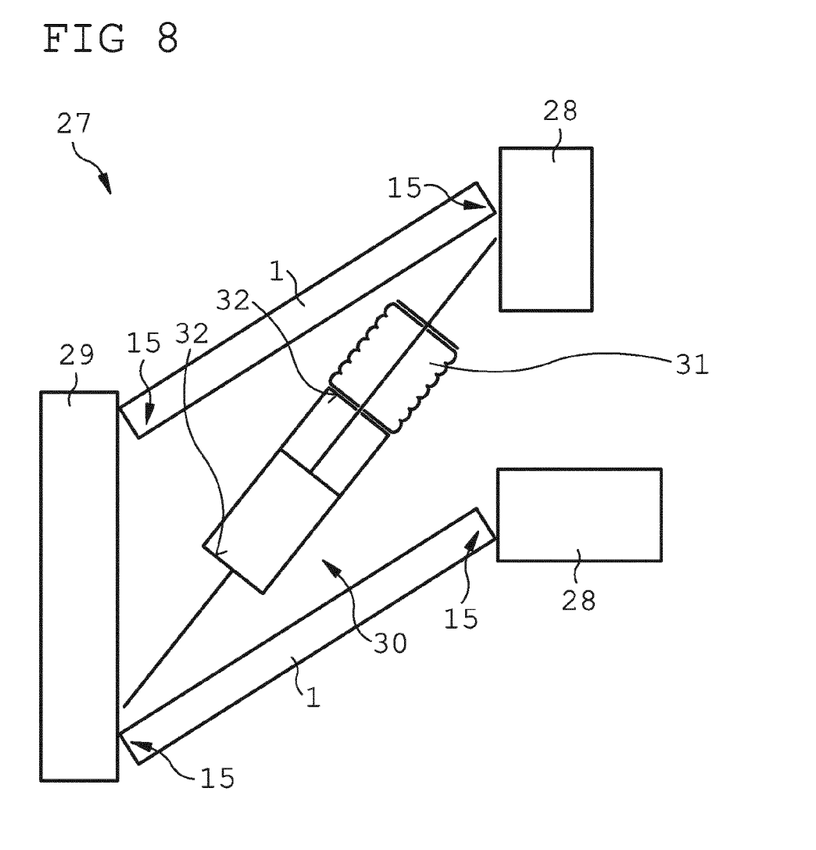
FIG. 8 is a schematic illustration of a wheel suspension arranged on a motor wheel and having a damping device.

FIG. 8 shows a schematic illustration of a wheel suspension 27 comprising two spring arm devices 1, wherein the wheel suspension has a damping device 30, which is pivotably arranged on the wheel carrier 29 and connected to a holm 28 of a vehicle carrier. The damping device 30 comprises a spring 31 having a nonlinear spring characteristic, wherein the spring 31 is designed and arranged such that the damping device 30 is prevented from butting against stops 32.

The invention claimed is:

1. Spring arm device for a motor vehicle comprising:
   two flanges arranged at a distance from each other and made of a first fiber composite material with fibers each oriented in a longitudinal direction of the flanges and having a web which connects the flanges and which is made of a second fiber composite material with the fibers oriented at positive angles to the longitudinal directions of the fibers of the flanges,
   wherein the spring arm device is adapted to be fastened in opposite end regions to vehicle parts as part of a wheel suspension,
   wherein the end regions comprise end segments of the two flanges and in each case one end segment of the web connects the end segments of the flanges, wherein
   the end regions are adapted to transmit forces introduced into the spring arm device in the longitudinal direction via the end regions,
   the flanges are adapted to counteract deformation of the spring arm device caused by forces acting in a normal direction of the web via a spring force and the spring arm device is adapted to transmit forces acting on the spring arm device in a transverse direction from the web to the end regions.

2. The spring arm device according to claim 1, wherein the flanges have a protrusion over opposite web surfaces of the web that is substantially uniform or adapted to the tensile course.

3. The spring arm device according to claim 1, wherein the fibers of the second fiber composite material run crossed to one another.

4. The spring arm device according to claim 1, wherein posts configured as rods are arranged in end portions of the web with the fibers running unidirectionally in the longitudinal direction of the posts or in the transverse direction of the spring arm device.

5. The spring arm device according to claim 1, wherein the flanges and the web are connected to each other in a pre-stressed position so that the spring arm device has an S-profile-shaped cross section along a center axis connecting the end regions in an unstressed state.

6. The spring arm device according to claim 1, wherein the flanges are aligned to one another at a trapezoidal angle.

7. The spring arm device according to claim 1, wherein a spring characteristic of the spring arm device is linear to progressive.

8. Wheel suspension having at least one spring arm device according to claim 1, wherein one of the end regions of the spring arm device is fastened to a wheel carrier of the wheel suspension and the end region opposite the fastened end region is adapted be connected to the chassis of a vehicle.

9. The wheel suspension according to claim 8, wherein the wheel suspension has a damping device, wherein the damping device is arranged on the wheel carrier in a pivotable manner and can be connected to the chassis, wherein the damping device comprises a spring having a non-linear spring characteristic, which is configured and arranged in such a way that the damping device is prevented from butting against end stops of the damping device.

10. The wheel suspension according to claim 8, wherein the spring arm device serves as a transverse stabilizer and/or longitudinal stabilizer.

11. The wheel suspension according to claim 8, wherein the wheel suspension comprises two spring arm devices which are arranged spaced from one another on the wheel carrier and configured in such a way that the spring arm devices act as a trailing arm, upper control arm, lower control arm, stabilizer and spring.

12. The spring arm device according to claim 2, wherein the fibers of the second fiber composite material run crossed to one another.

13. The spring arm device according to claim 2, wherein posts configured as rods are arranged in end portions of the web with the fibers running uni-directionally in the longitudinal direction of the posts or in the transverse direction of the spring arm device.

14. The spring arm device according to claim 2, wherein the flanges and the web are connected to each other in a pre-stressed position so that the spring arm device has an S-profile-shaped cross section along a center axis connecting the end regions in an unstressed state.

15. The spring arm device according to claim 2, wherein the flanges are aligned to one other at a trapezoidal angle.

16. The spring arm device according to claim 2, wherein a spring characteristic of the spring arm device is linear to progressive.

17. The wheel suspension according to claim 9, wherein the spring arm device serves as a transverse stabilizer and/or longitudinal stabilizer.

18. The wheel suspension according to claim 9, wherein the wheel suspension comprises two spring arm devices, which are arranged spaced from one another on the wheel carrier and configured in such a way that the spring arm devices act as a trailing arm, upper control arm, lower control arm, stabilizer and spring.

19. The wheel suspension according to claim 10, wherein the wheel suspension comprises two spring arm devices, which are arranged spaced from one another on the wheel carrier and configured in such a way that the spring arm devices act as a trailing arm, upper control arm, lower control arm, stabilizer and spring.

* * * * *